INVENTORS.
GARY J. WOODS
WALTER E. PARSONS
HAROLD G. JOHNSON
G. MERRITT PRESTON
THOMAS S. WALTON
JACOB C. MOSER

BY

ATTORNEYS

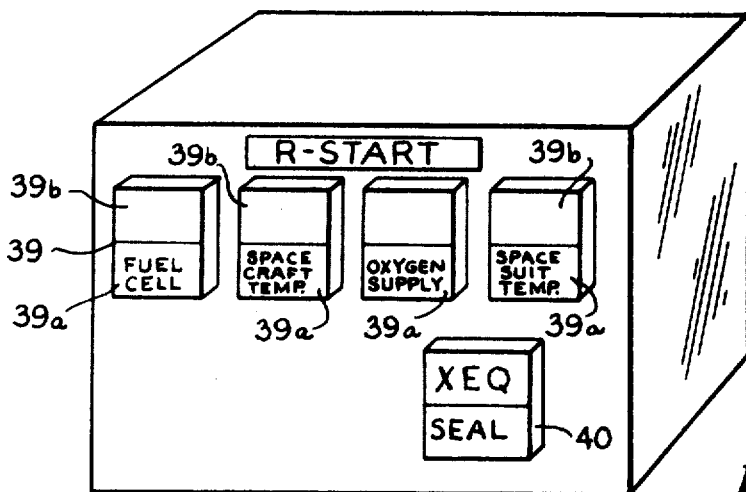
Fig. 3.
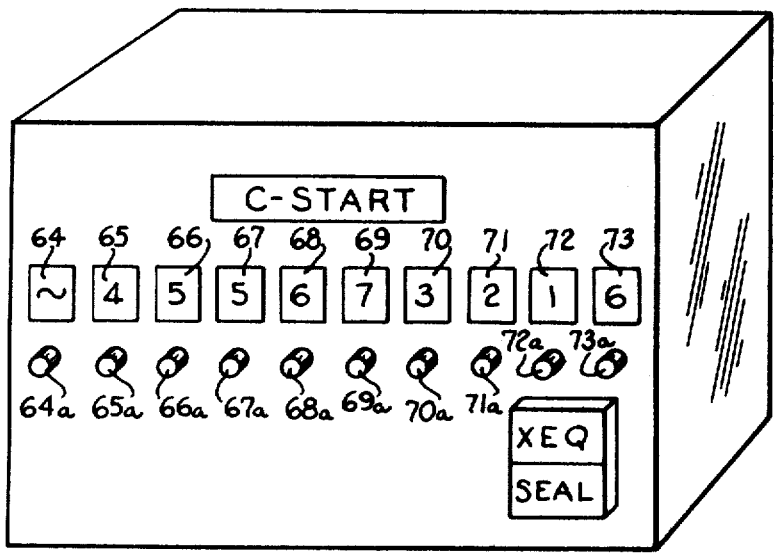
Fig. 4.
Fig. 5.
INVENTORS.
GARY J. WOODS
WALTER E. PARSONS
HAROLD G. JOHNSON
G. MERRITT PRESTON
THOMAS S. WALTON
JACOB C. MOSER
BY
ATTORNEYS

LOAD BUFFER MEMORY RELAY DATA FORMAT

INVENTORS.
GARY J. WOODS
WALTER E. PARSONS
HAROLD G. JOHNSON
G. MERRITT PRESTON
THOMAS S. WALTON
JACOB C. MOSER

ATTORNEYS

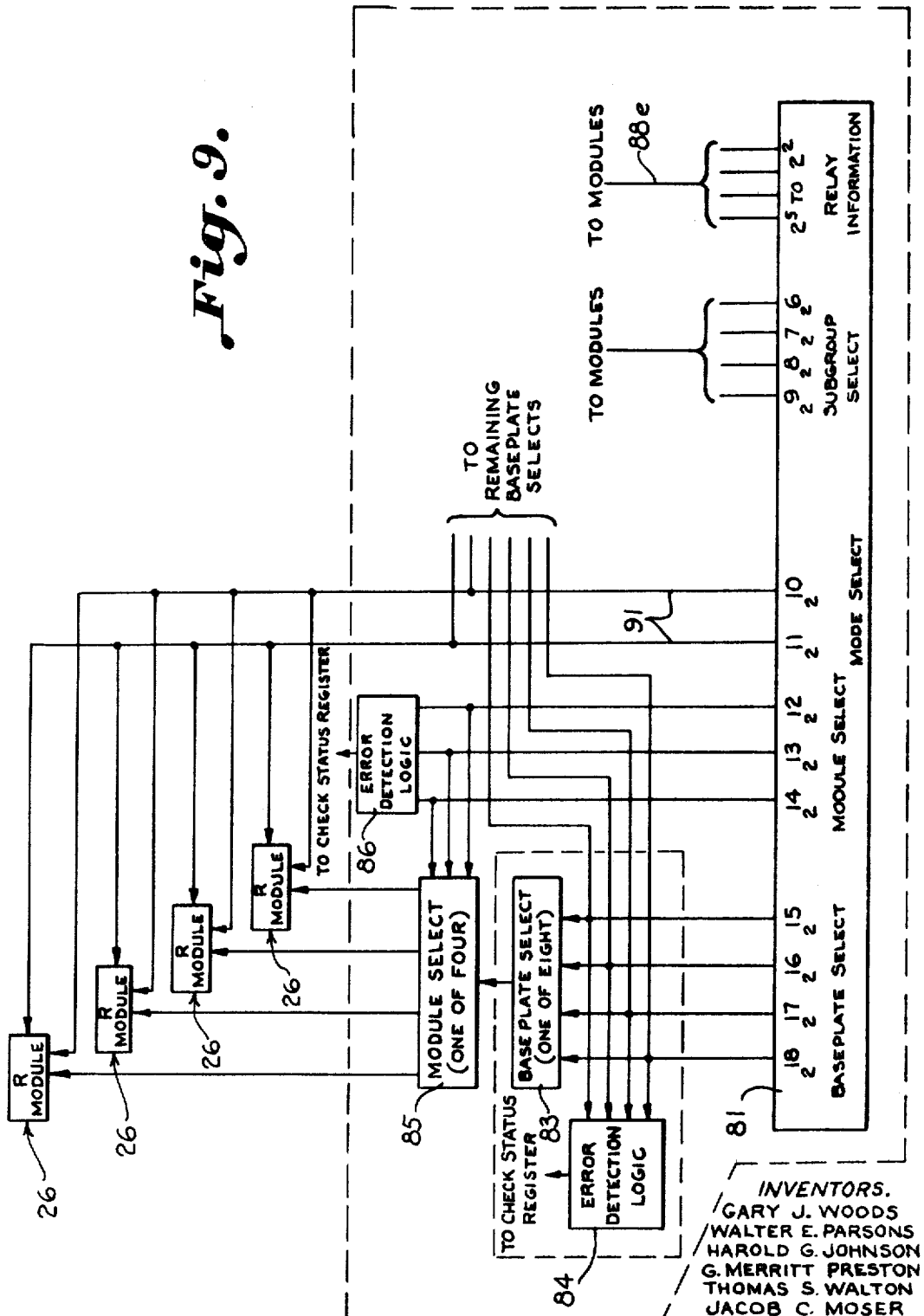

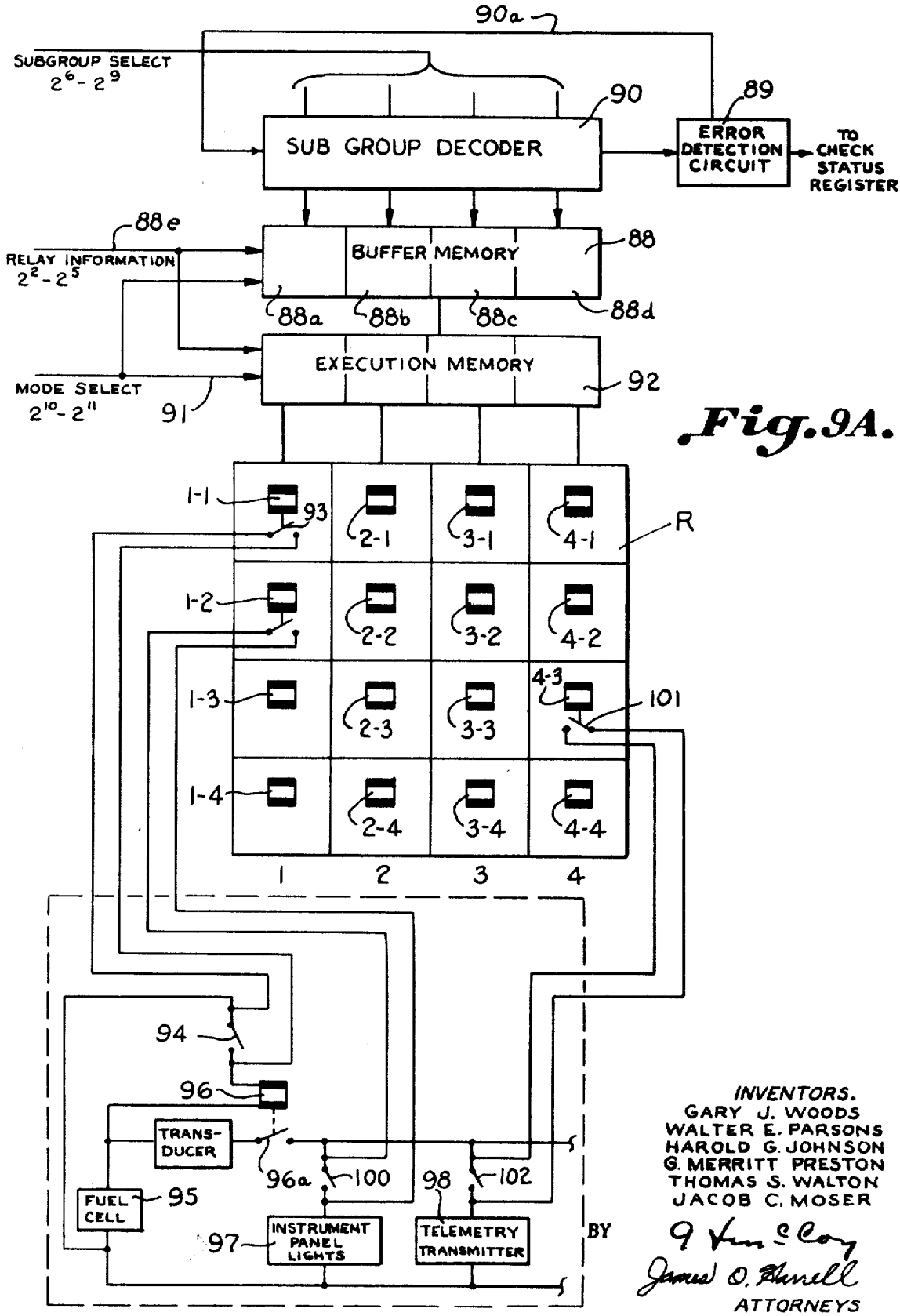

INVENTORS.
GARY J. WOODS
WALTER E. PARSONS
HAROLD G. JOHNSON
G. MERRITT PRESTON
THOMAS S. WALTON
JACOB C. MOSER

ATTORNEYS

United States Patent Office 3,535,683
Patented Oct. 20, 1970

3,535,683
ELECTRONIC CHECKOUT SYSTEM FOR SPACE VEHICLES
Gary J. Woods, Titusville, Walter E. Parsons, Kissimmee, Harold G. Johnson, Eau Gallie, George M. Preston, Indian Harbor Beach, Thomas S. Walton, Merritt Island, and Jacob C. Moser, Indialantic, Fla., assignors to the United States of America as represented by the Administrator of the National Aeronautics and Space Administration
Continuation-in-part of application Ser. No. 621,746, Mar. 7, 1967. This application Nov. 7, 1969, Ser. No. 874,958
Int. Cl. G05f 23/02
U.S. Cl. 340—172.5                    14 Claims

ABSTRACT OF THE DISCLOSURE

A system for testing a space vehicle thoroughly, accurately, and with a minimum of engineering personnel. It checks out thousands of functional elements by utilizing digital computer systems. These computer systems automatically send and monitor routine, repetitive and prelaunch commands.

---

The invention described herein was made by employees of the United States Government, and may be manufactured and used by or for the Government of the United States of America for governmental purposes without the payment of any royalties thereon or therefor.

This application is a continuation-in-part of copending application Ser. No. 621,746, filed Mar. 7, 1967 now abandoned.

This invention relates to a control and monitoring system for a plurality of condition responsive devices, and more particularly to a check out and monitoring system for a spacecraft and its associated ground support equipment.

The evolutionary development of man exploration of space has progressed from suborbital space flights lasting only minutes to earth orbital flights lasting many hours. As the more advanced space projects unfold manned space flights will progress from the present state of earth orbital missions lasting several days to translunar, cis-lunar, and lunar landing missions which will require at least one week, and possibly several weeks to complete.

To sustain men for extended periods of time in the hostile environment of space it is, of course, necessary to provide thorough flight-tested and dependable life support, guidance and control communications, thermo protection, and other electrical and mechanical spacecraft systems. It has been found that as mission durations increase, each system becomes more complex and more sophisticated.

This increase in system sophistication results in an attendant increase in the need for highly trained test evaluation personnel and more complex ground checkout equipment. To accomplish extended missions of increasing launch frequency with the test philosophy and systems heretofore used would require many more highly trained engineering personnel capable of continually evaluating large quantities of preflight checkout data. Increasing the number of trained engineers for monitoring and checking out more complicated space vehicles has not proven to be feasible due to the time and expense necessary to train qualified personnel for assessing checkout equipment associated with a space vehicle.

Another problem encountered in utilizing large numbers of personnel is in coordinating the commands being transmitted to the space vehicle and received therefrom during the preflight acceptance checkout operation.

Heretofore, in monitoring functional components of a spacecraft and its associated ground supporting equipment, a command station was positioned in close proximity with the space vehicle and monitoring equipment was located at a remote station. As a result, one group of checkout personnel was sending the commanding signals to the space vehicle, while another group of monitoring personnel was receiving the information from the space vehicle. Normally, a co-ordinator was in communication with both the command station and the monitoring station attempting to co-ordinate the signals being supplied to the space vehicle and returned therefrom. Such has not proven to be practical, since frequently important is lost in co-ordinating the information. For example, if a command signal were sent to start an engine or similar device, and it was important to monitor the valve setting for the device, the command engineer would know that a light associated with the valve settings should go out immediately upon starting the engine, and if there were a small lapse of time between the starting of the engine and the light going off, such would generally indicate that there is a malfunction in the valving system or the engine. When the monitoring station is located at a remote distance from the command station frequently this small lapse of time between sending a command signal to the spacecraft and receiving a response is missed due to the fact that the engineer in the monitoring station is merely looking to determine if the particular function has taken place.

Heretofore, in order to provide communications between the command station and the space vehicle which was being monitored thousands of wires were connected therebetween and each wire was connected to a respective functional element under command or being monitored. Not only has this vast number of wires been expensive: they have proven to be impractical in that a spacecraft, or the various systems associated therewith may be moved several times during its testing operation and each time that such is moved, for example, from a test station to the launching pad, the wires communicating between the command station and the monitoring station and the spacecraft had to be disconnected and reconnected. Such has proven to be a long and tedious job requiring many man hours and frequently interferring or delaying launch schedules. Since the cables are fed through the hatch in the spacecraft, such also restricts the area within the spacecraft provided for the astronaut.

Another problem which prevented cables in the vicinity of fifteen miles long from being in checkout system heretofore, was attenuation or degradation of the signals. If degradation of signals took place, such would result in valuable command and monitoring signals being lost in the transmission. Such is especially true where the space vehicle is being tested in an area where electrical noises are subject to be picked up by the transmission cables.

It is not practical nor feasible to utilize temporary block houses for the command station where complicated space vehicles are being checked out, which would normally require long checkout periods, if the procedure and method of checking out the space vehicle were utilized similar to those used in the past on less sophisticated space vehicles. One reason being due to the fact that the area in the immediate vicinity of the space vehicle is normally a hazardous area due to toxic propellants used in the space vehicle and the possibility of explosion of such.

Moreover, it is desirable that the command stations be as comfortable as possible for the test engineers, since tests would frequently last as long as twenty hours. Where the command stations are of a temporary nature it is not economically feasible to construct such to provide test engineers with a maximum of comfort during the long test.

In accordance with the present invention, it has been found that the foregoing difficulties and disadvantages presented by the prior checkout and monitoring equipment discussed above may be overcome by providing a novel acceptance checkout equipment system for spacecrafts and the like. The acceptance checkout equipment system is capable of sending command signals to a plurality of functional components carried on a space vehicle and in its associated ground support equipment, as well as for monitoring other functional components, such as sensing probes and meters carried on the spacecraft, during the testing operation.

The spacecraft prelaunch automatic checkout equipment system constructed in accordance with the present invention includes two systems. One system for sending command signals to functional elements carried on the spacecraft and in its associated ground support equipment is generally referred to as the command system or the up-link portion of the overall system. The second system is generally referred to as the monitor system wherein functional elements carried on the spacecraft and its associated ground supporting equipment are monitored and signals are transmitted back to a control room so that computers and engineers can analyze the information being received in order to determine if the functional component being monitored are operating properly. Some of the information being sent to the control room is displayed in engineering units, such as volts, pounds, temperature, etc., so that a test engineer can readily analyze such.

The command system constructed in accordance with the present invention includes the following basic parts: (1) A plurality of control start-modules located in a remote command center, (2) means for selectively activating a control start module for generating a command signal in digital form identifying a particular functional component located in a spacecraft, or in its associated ground support equipment and the function to be performed thereon, (3) a communication means, hereinafter referred to as communication unit executor or "CUE" for scanning the control modules and temporarily storing the command signal from an activated module, (4) a transmission validity checking circuit forming a part of the communication means for comparing the transmitted command signal with a redundant command signal for determining transmission errors, (5) a computer coupled to the output of the communication means for receiving the command signal from the communication means and generating a functional code in digital form responsive thereto, (6) data transmission and verification converting means coupled to the output of the computer for transforming the functional code from the computer into a set of sequential digital words comprising a frame of bits and its complement for transmission over long distance with a minimum of degradation, and (7) a receiver decoder coupled to the output of the data transmission and verification converting means for comparing each frame of sequential bits with its complement, and for transmitting a signal indicative of the desired function to be performed on the selected functional component when the frame of bits compare with its complement. The control start modules are such that they generate a plurality of identifying parallel bits of information when activated and a portion of the parallel bits represent an address signal. The remainder of the parallel bits represent the particular function which is to be performed.

While the up-link portion of the command checkout system provides a reliable system wherein command signals may be automatically sent to functional elements on a spacecraft under the control of a computer, it also provides a manual override system wherein test engineers located in the control center may selectively send command signals to the functional elements carried in the space vehicle, and in its associated ground support equipment.

The space vehicle is divided into a plurality of systems for the convenience of sending command signals thereto, and monitoring such. Examples of such systems or subsystems are, the spacecraft in which the astronauts ride, the lunar excursion module, if one is carried on the space vehicle, the service module, and the ground support equipment for the space vehicle. The space vehicle may be divided into many subsystems, and usually the controlling factor in determining how such should be divided is governed by the major components of the space vehicle and the most convenient manner of grouping the functional elements. It is evident that is would be desirable that the spacecraft be treated as at least one subsystem, since normally the equipment in the spacecraft is tested at test locations prior to assembling the space vehicle, and after the space vehicle has been assembled on the launch pad such is checked out again prior to launching. Thus, it can be seen for the purpose of grouping the transducers associated with a space vehicle, in order to minimize the cabling within the systems, while allowing the systems to be transported from one location to another with a minimum amount of electrical hookups each time such is transported, it is desirable that such be divided into subsystems.

As previously mentioned, in checkout equipment heretofore used, thousands of wires were connected and disconnected from the subsystems each time such were moved from one location to another. The preflight acceptance checkout equipment system constructed in accordance with the present invention eliminates such mass hookups and disconnections.

The monitoring device constructed in accordance with the present invention includes the following basic parts: (1) A plurality of functional components carried in each system associated with the space vehicle, (2) a transducer coupled to each functional component for generating a signal indicative of the operating condition of the respective functional component, (3) a pulse code modulator associated with each system for scanning and receiving the signals from the transducers of a system and converting the signals into binary words of sequential bits of digital information, (4) means for interleaving the words of the sequential bits of digital information from the pulse code modulators for producing a sequential chain of binary bits of information, (5) a remotely located decommutator provided for receiving the chain of binary words from the interleaving means (the decommutator may be located many miles from the interleaving means), (6) the decommutator reconstructs the chain of sequential binary bits of information into binary words and feeds the reconstructed words out in parallel form, (7) a computer provided for receiving the binary words from the decommutator and by programmed adaptive technics checking them against preprogrammed tolerances, (8) the computer converting the binary words into signals capable of activating display media, and (9) display media located in the control room connected to the output of the computer for receiving the signals from the computer and producing information in the form adapted to be recognized by the human eye and comprehended by test engineers. The display media includes cathode ray tubes capable of displaying the information received from the computer on its screen in alphanumeric characters, analogue and digital modules which include meters, such as volt meters and the like, and recorders for making permanent records of the information being received during the monitoring operation.

Accordingly, it is an object of the present invention to provide a preflight acceptance checkout equipment system which minimizes the problems outlined above in connection with testing and monitoring a space vehicle.

Another important object of the present invention is to provide a preflight acceptance and checkout equipment system, wherein command signals being received therefrom are coordinated in a central test station remotely located from the space vehicle.

Still another important object of the present invention is to provide a command and monitoring system for a space vehicle and the like, wherein a relatively few persons can perform the entire command and checkout operation.

Another object of the present invention is to provide a command and monitoring system for a space vehicle which is program adaptive and capable of processing the presenting large amounts of data in engineering units such as temperature, volts, etc.

A further important object of the invention is to provide a checkout and monitoring system for a space vehicle which is completely under the control of test engineers at all time, but lends itself to any degree of automation desired, and is expandable in modular blocks to meet the checkout and launch control requirements of the foreseeable future.

Still another object of the present invention is to provide an acceptance checkout equipment system for a space vehicle and the like, wherein signals are transmitted throughout the system in a step by step manner and a check is made for transmission errors at each step.

Still another important object of the present invention is to provide a command and monitoring system for space vehicles which permits independent testing of major subsystems of the space vehicle in remote areas from a central command and monitor station.

Another important object of the present invention is to provide a command and monitoring system for a space vehicle where there is a minimum amount of signal degradation and attenuation between the control center and the space vehicle being monitored.

Still another important object of the present invention is to monitor functional elements carried on a space vehicle and present the information in a remotely located control room in engineering units, such as pounds, volts, temperature, etc., so that such can be readily analyzed by test engineers.

A further important object of the present invention is to provide a monitoring system for a space vehicle and the like, wherein a high speed computer scans pulse code modulation systems associated with the space vehicle and ground support equipment for continuously checking for out of tolerance conditions of the functional components carried within the space vehicle, and presenting signals to test engineers located in a remote control center of such out of tolerance conditions.

Still another important object of the present invention is to provide a command and monitoring device for a space vehicle, wherein test engineers are not burdened with overwhelming amounts of repetitive and tedious data validation during long periods of testing of systems of a space vehicle and especially during the critical launch phase of a space vehicle.

Another important object of the present invention is to provide a command and monitoring system for a space vehicle and the like, wherein signals are transmitted between a remotely located command station and the space vehicle in digital form so as to minimize the amount of cabling between the command station and the space vehicle.

A further important object of the present invention is to provide a command and monitoring device for a space vehicle and the like, wherein there is an interconnection between the command portion of the system and the monitoring portion of the system for providing communication therebetween.

Still another object of the present invention is to provide a command and monitoring device for a space vehicle and the like, wherein the superior skill of a test engineer over that of a machine in responding to complex and unexpected situations is utilized to the maximum.

Other objects and advantages of this invention will become more apparent from a reading of the following detailed description and appended claims taken in conjunction with the accompanying drawings wherein:

FIG. 3 is a pictorial view of an R-start module utilized within the system;

FIG. 4 is a pictorial view of a C-start module which is utilized in the system;

FIG. 5 illustrates in block form a forty-eight bit message which is transmitted by a data transmission and verification converter to a digital test command system carried within a space vehicle or in its ground support equipment;

FIG. 9 illustrates in block form the circuitry and the flow of information therethrough for selecting a particular relay module;

FIG. 9A illustrates in block form the circuitry of an R module;

Figure 13:
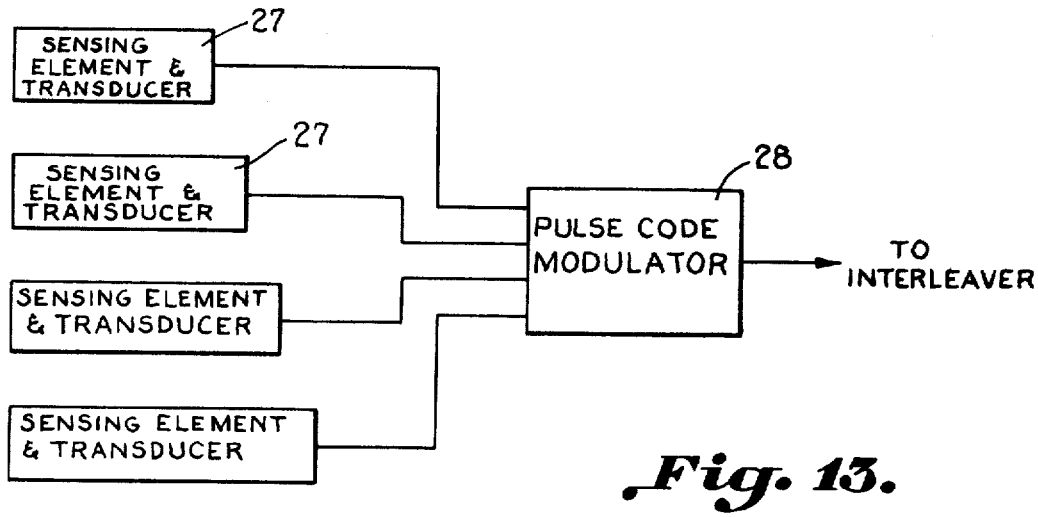
Figure 12:
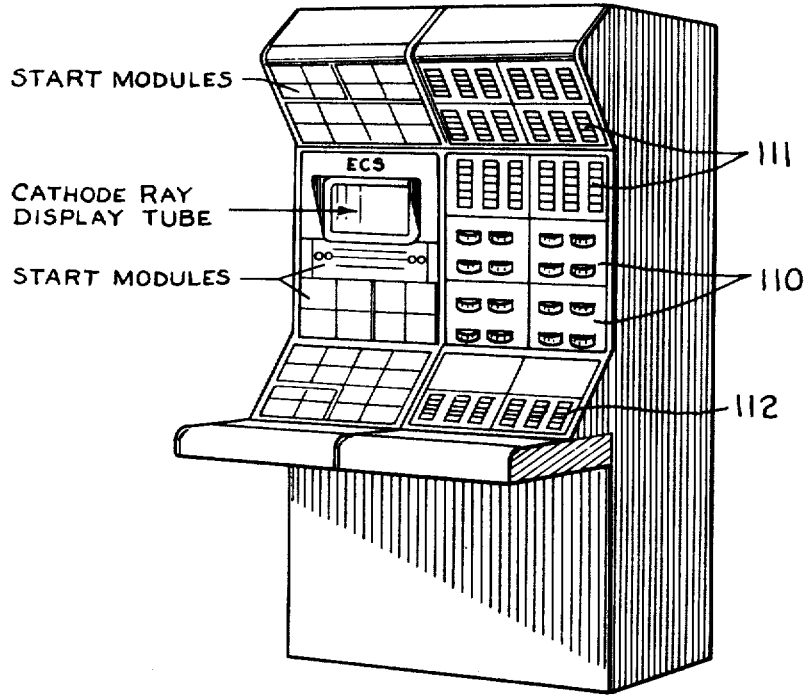

FIG. 12 illustrates one particular console which is utilized within the control center for co-ordinating the commands being sent through the command system and the information being received back through the monitoring system; and FIG. 13 illustrates in block form a plurality of sensing elements and transducers carried within the space vehicle or its ground support equipment, and a pulse code modulator for monitoring such.

Figure 1:
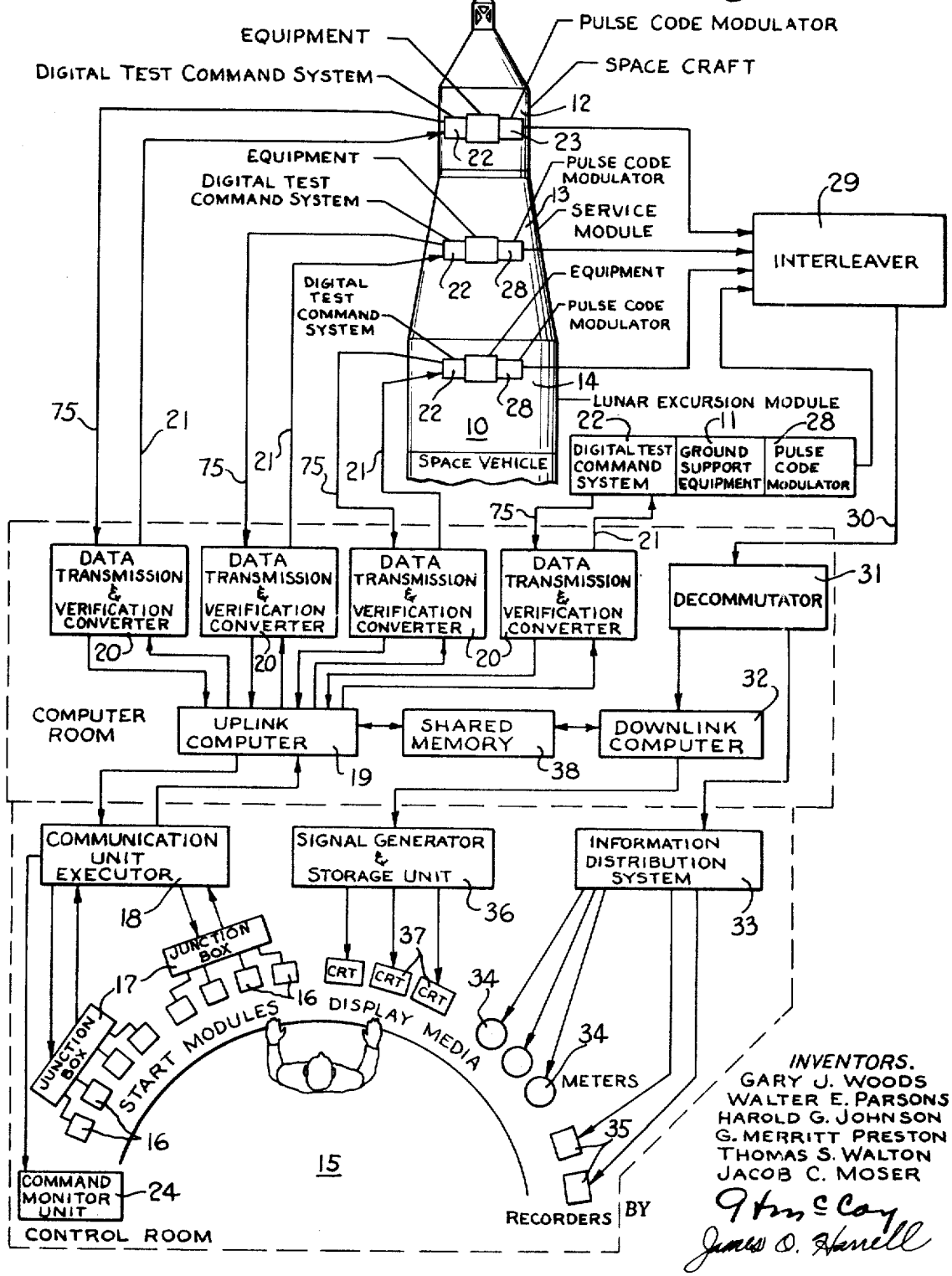
FIG. 1 is a block diagram illustrating a preflight acceptance checkout equipment system constructed in accordance with the present invention.

Referring now in more detail to the drawing where FIG. 1 illustrates in block form the major components of the preflight acceptance checkout equipment system for a space vehicle 10 and its associated ground support equipment 11, and wherein the up-link portion or command system is illustrated on the left-hand side of the drawing and the down-link portion or the monitoring system is illustrated on the right-hand side of the drawing. The space vehicle is illustrated as being divided into three systems, a spacecraft 12, a service module 13, and a lunar excursion module 14.

The portion of the up-link or command system which is located in a central control room, generally designated at 15, may be many miles from the space vehicle being tested and includes subsystems referred to as "start modules" 16, which are connected through junction boxes 17 to a subsystem referred to as the "communication unit executor" 18.

The start modules communicate with the rest of the command system through the communication unit executor 18, and each are provided with a plurality of functional switches which enables the test engineers located within the control room 15 to send command signals through a communication unit executor 18 to an up-link computer 19. When a test engineer desires to send a command signal to the functional components located within the space vehicle or in its ground support equipment, he merely depresses the desired functional switches located on a respective start module 16 to load the information into the start module. After he has loaded the information into a particular start module he then depresses an execute button which sends a signal to the communication unit executor 18 indicating that the particular start module is ready for interrogation. The communication unit executor 18 includes a scanner which is scanning the start modules, and when such detects an execute signal from a particular module it interrogates that particular module and transfers the information which is in parallel form from the activated start module to a temporary storage unit located therein. A redundant signal corresponding to the initial signal sent from the start module is automatically sent to the communication unit executor 18 so that the comparators located within the communication unit executor can compare the original signal sent with the redundant signal in order to determine if the signal was transferred properly. The communication unit executor 18 in turn, transmits an interrupt signal to the up-link computer 19 signifying to the computer that such is loaded and ready to transmit information thereto. The up-link computer 19 sends a signal back to the communication unit executor 18 indicating such is ready to receive the information or command signal from the communication unit executor 18. The information is then transferred from the communication unit executor 18 into the up-link computer 19, which in turn, sends a corresponding signal in parallel form back to the communication unit executor in order to determine if there were any transmission errors. Assuming that there were no transmission errors between the communication unit executor 18 and the up-link computer 19, the computer then will decode the signal and transmit a corresponding signal in the form of two twelve bit parallel words to a selected data transmission and verification converter 20. The information coming into the computer 19 determines which data transmission and verification converter 20 and module 26 is to be selected.

Normally, the up-link computer 19 and the data transmission and verification converters 20 are located in a computer room which is in the same building with the master control room 15 from which the command signals were initiated. The data transmission and verification converter 20 will receive the two twelve bit parallel words and convert such words into a message comprising a pair of twenty-four bit words in serial form. Each of the twenty-four bit serial words contain a twelve bit word in serial form and a redundant twelve bit word (see FIG. 5). Thus, the information being transmitted from the data transmission and verification converter 20 is in the form of a forty-eight bit message consisting of two twenty-four bit words.

Each data transmission and verification converter 20 is connected by a respective cable 21 to a digital test command system 22 carried within the space vehicle 10 or its associated ground support equipment 11. In some instances the distance between the data transmission and verification converters 20 and the digital test command system 22 located within the space vehicle may be as far as fifteen miles or more. By transmitting the information therebetween in trains of binary bits of information the likelihood of degradation and attenuation of the signals is considerably less than would be the case if analogue signals were transmitted directly from a control room to a remotely located spaced vehicle or testing area.

Another advantage of transmitting information from the master control room to the space vehicle in a coded binary word is that a single transmission cable, such as 21, may be utilized instead of using thousands of cables connected directly between the command station and the space vehicle being checked out.

By incorporating the majority of the test equipment within a master command center and utilizing a single cable between the data transmission and verification converters 20, and the subsystems 12 through 14 of the space vehicle such enables the subsystems to be checked out and monitored at various locations and then be transported to a different location with a minimum amount of disconnecting and reconnecting cables. Not only is disconnecting and reconnecting thousands of cables time consuming, but the vast number of connections enhance the possibility of errors during the checkout period frequently interferring with testing and launch schedules of space vehicles. In the checkout system constructed in accordance with the present invention the digital test command systems 22, which include a receiver decoder 23, may be placed on board the spacecraft and moved with the spacecraft as such is shifted from one location to another thereby, requiring only that two cables be disconnected and reconnected.

The receiver decoder 23 takes the first twelve bit word of the forty-eight word bit message and checks it against the successive redundant twelve bit word for determining if there are any transmission errors. Then it checks the third twelve bit word with the fourth twelve bit word for determining if there are any transmission errors therein. If a transmission error occurs, the receiver decoder 23 will send a signal back to the data transmission and verification converter 20, which in turn will send a signal to the up-link computer 19 indicating a transmission error occurred. The up-link computer 19 will then send a signal back through the communication unit executor 18 to a command monitor unit 24 located in the control room, which generates a display signal that can be observed by a test engineer.

By sending the information to the receiver decoders 23 over cables 21 in the form of two twenty-four bit chains each including a twelve bit word and its redundant, such increases the speed in which information can be fed to the receiver decoders 23. Such is due to the fact that other messages or command signals can be placed on line 21 immediately behind a previous signal without having to wait for a check signal to be sent back to the data transmission and verification converter 20. For example, the cable 21 may be loaded with several messages simultaneously, one trailing the other.

In addition to having a receiver decoder 23 in each digital test command system 22 associated with a particular system of the space vehicle or its ground support equipment, a module selecting circuit, generally designated at 25, and a plurality of modules 26 are included in each system for selecting a desired functional element within each system.

The receiver decoder 23 selects the desired functional module in a Christmas tree-like manner. For example, the coded signal which is in the form of parallel binary bits of information, first selects a group of base plates A, B, C or D (see FIG. 6) on which the desired module to be activated is located, then it selects one of eight base plates. Each of the base plates includes four modules of the relay type or digital to analogue type, R module and DAC module, respectively. An R module contains four subgroups of relays 1, 2, 3 and 4, respectively, any one of which may be activated by the coded signal. Each subgroup of relays contain four relays. For example, 1–1 through 1–4 (see FIG. 9). Thus, there are sixteen relays in an R-module. If it is desired that the particular functional element, such as the switch, be closed so as to test the circuitry in which the switch is located, normally such is accomplished by placing a relay contact in shunt and/or series with the control switch so that by selecting a particular relay located within a module such can be energized to close the circuit for testing the operation of such.

A digital to analogue converter module DAC is utilized for sending an analogue signal to one of the functional elements within the space vehicle 10 or its ground support equipment 11. The digital test command system which includes the receiver decoder 23 and the modules R and DAC is discussed more fully below in connection with FIGS. 6 and 9. The digital test command system may consist of any conventional, well-known circuits. Suitable circuits which may be used are disclosed in a publication entitled "Digital Test Command System," Accession No. N69–75688, NASA–CR–104080. This publication, as well as those mentioned hereinafter, is available to the public from the Clearinghouse for Federal Scientific and Technical Information, Port Royal Road, Springfield, Va. 22151.

Thus, it can be seen that the brief description of the command system, which is considered to be the up-link portion of the preflight acceptance checkout equipment system, that a test engineer in a remotely located control room can send command signals for selectively operating functional components within a space vehicle and its associated ground support equipment for testing the operability of such. Moreover, the up-link computer 19 is programmed so that such can automatically send routine and repetitive commands to the space vehicle during the checkout operation in order to speed up the checkout operation, as well as relieving test engineers of tedious routine checks. If during the checkout portion, which is under control of the computer, a malfunction or a fault occurs, then a signal is produced by the computer and sent to the command monitor unit 24, via the communication unit executor 18, located within the control room so as to notify the test engineer of such. When the test engineer's attention is attracted by such a false or malfunction indication, he then takes the appropriate action to correct the condition.

The command monitor unit 24 accepts and displays four types of information transferred from the communication unit executor system 18. These four types are identified as CUE status data, computer peripheral equipment status data, digital test command system malfunction data, and CUE-start malfunction data. The CUE status data provides a visual display of the location of the CUE scanner address. The digital test command system malfunction display has four readout displays, labeled group, base plate, module, and subgroup, for indicating whether an error takes place in sending a coded signal to the components. The manner in which the coded signals are sent to these components and an error check signal is sent back is discussed more fully below.

The information coming into the control monitor unit 24 is successively displayed within a plurality of banks so that the first malfunction shall appear in an upper bank, the second malfunction on the second bank, et. After the test engineer has corrected the malfunction he may reset the command monitor unit enabling the particular bank to receive additional malfunction information. If the command monitor unit is filled to capacity with error indication information, a signal is sent to a status register located within the communication unit executor system as is more fully discussed in connection with FIG. 2. The command monitor unit may comprise any conventional, well-known display device. One suitable display device is disclosed in a publication entitled "ACE–S/C Command Monitor Unit," Accession No. N69–75686, NASA–CR–104079.

In any checkout and launch control system, the question of how engineering talent can be most profitably and efficiently utilized is foremost in the mind of the test operation director. To accomplish sophisticated missions where launch windows are narrow, little time can be allotted to the engineering personnel for scanning large quantities of raw spacecraft data. However, to insure proper system operation at lift-off, large quantities of data from the spacecraft must be scanned and compared with preset tolerances or limits. In some of the checkout or monitoring systems for space vehicles heretofore used, the data received during the testing or monitoring operation of the space vehicle was frequently stored for later analysis. However, such has not proven to be practical or feasible, since most launch schedules require quick decisions and dictate that test conditions be constantly and progressively changed.

The monitoring system constructed in accordance with the present invention is under computer control so that signals or information produced during the monitoring operation can be automatically compared with preset tolerances or limits within a down-link computer relieving test engineers of such routine functions. When there is a malfunction or out of tolerance signal produced, the test engineers are notified of such by the computer. Such relieves the test engineers of the burden of analyzing overwhelming amounts of repetitive and tedious data during long periods of testing and especially during the critical launch phase, permitting their skills to be utilized to analyze unexpected problems, and to remedy such situations. In order to aid the test engineers in the analysis of the information being received during the monitoring operation, the information is presented in engineering units, such as pounds per square inch, volts, temperature, etc., on the face of indicia bearing media, such as cathode ray tubes.

For aiding in monitoring functional elements, such as fuel cells, temperature gauges, oxygen meters, etc., carried within the space vehicle, the space vehicle is divided into a plurality of systems. Each system has a plurality of sensing elements 27 therein, which are utilized for measuring certain parameters, and there is a transducer associated with each sensing or functional element 27 in order to produce a signal indicative of the measurements being made (see FIG. 13). Each system has a pulse code modulator 28 associated therewith for periodically and systematically scanning the transducers 27 located within the system and digitizing the signals received therefrom. In other words, the signals received from the transducers are converted by the pulse code modulator 28 into binary code form representing the value of the samples. This binary code is a string of "on-off" pulses denoting a plurality of binary bits of information in the form binary 1's and binary 0's. The pulse code modulator converts the signal from the transducers into eight bit binary words. Each word is a literal representation in binary form of the value of the sample voltage from the transducer. The pulse code modulator may be constructed of any conventional, well-known circuits. Suitable circuits are disclosed in a publication entitled "Pulse Code Modulation System," Accession No. N69–75692, NASA–CR–104075.

Each of the pulse code modulators produces a chain of output words on its output and transmits the chain of binary bits of information to a pulse code modulation data interleaver 29.

In FIG. 1 of the drawings, there are four pulse code modulation data gathering systems 28 for monitoring parameters, each of which may, for example, produce a serial output of 51.2 kilobits per second. The interleaver 29 is operated at four times the speed of any one of the pulse code modulator systems 28 and interleaves the serial trains from the four systems into a high speed data train of 204.8 kilobits per second comprising all of the information thus gathered. The interleaver may consist of any conventional, well-known circuits. Suitable circuits are disclosed in a publication entitled "Miniaturized Data Interleaving System," Accession No. N69–75689, NASA–CR–104074.

The train of binary bits of information leaving the interleaver 29 is fed in the embodiment illustrated over a hard line 30, such as a coaxial cable to a decommutator 31, which is generally located within the same building as the master control room. It is within the scope of this invention that instead of using a hard line 30, which may be as long as fifteen miles between the interleaver 29 and the decommutator 31, the interleaver 29 could be provided with a radio frequency transmitter for transmitting the signals and the decommutator 31 could be provided with a suitable receiver for receiving the signal. Such is also true for the up-link portion instead of cables 21 and 75.

The decommutator 31 is synchronized to the serial bit stream coming out of the interleaver and reconstructs the individual eight bit words which were originally produced by the pulse code modulation data gathering systems 28. The decommutator counts the bits of information coming therein and feeds reconstructed eight bit words out. The decommutator may consist of any conventional, well-known circuits. Suitable circuits are disclosed in a publication entitled "ACE–S/C Data Acquisition System," Accession No. N69–75693, NASA–CR–104077.

The information coming out of the decommutator 31 is fed in parallel form to a down-link computer 32, as well as to a conventional information distribution system 33. The information distribution system 33 channels the incoming words to appropriate meters 34 located within the master control room for displaying the information. The information distribution system also feeds the binary words into recorders 35 which record all of the information being monitored.

The down-link computer 32 is programmed for processing the parallel words coming therein from the decommutator 31 and for providing checks on selected words against preprogrammed tolerances. The down-link computer 32 transmits the information to a signal generator and storage unit 36 for subsequent display on cathode ray tubes 37. The signal generator and storage unit may consist of any conventional, well-known circuits. Suitable circuits are disclosed in a publication entitled "ACE–S/C A/N Display System," Accession No. N69–75687, NASA–CR–104081.

The cathode ray tubes 37 display the monitored information in alphanumerical characters so that the test engineers can readily observe and analyze the information. The cathode ray tubes are provided with selecting dials (not shown) which permit the test engineers by merely rotating such to select the desired information to be transferred from the signal generator and storage unit and displayed on the picture tube. If the down-link computer 32 senses an out of tolerance signal condition in the information contained in one or more of the words, it displays this information on the cathode ray tube in a blinking manner so as to attract the attention of the engineer observing the display media.

A shared memory 38 is interconnected between the up-link and down-link computers 19 and 32, respectively, so that information can be shared by both the computers for processing parameters outside of the control of the test engineer sitting at the consoles. For example, if the engineer commands a valve to open through the up-link portion of the acceptance checkout equipment system for filling a tank with hydrogen to the fifty percent level, the down-link computer will continuously monitor the sensing probe associated with that particular tank until the fifty percent level is reached, at which time it will send a signal automatically to the up-link computer through the shared memory directing such to close the valve. The down-link computer 32 will also send a signal to the console to notify the test engineer that such has been accomplished. The up-link and down-link computers 19 and 32 and shared memory 38 may consist of any conventional, well-known designs. Suitable designs are disclosed in a publication entitled "ACE–S/C Data Processing System," Accession No. N69–75694, NASA–CR–104082.

Figure 2:
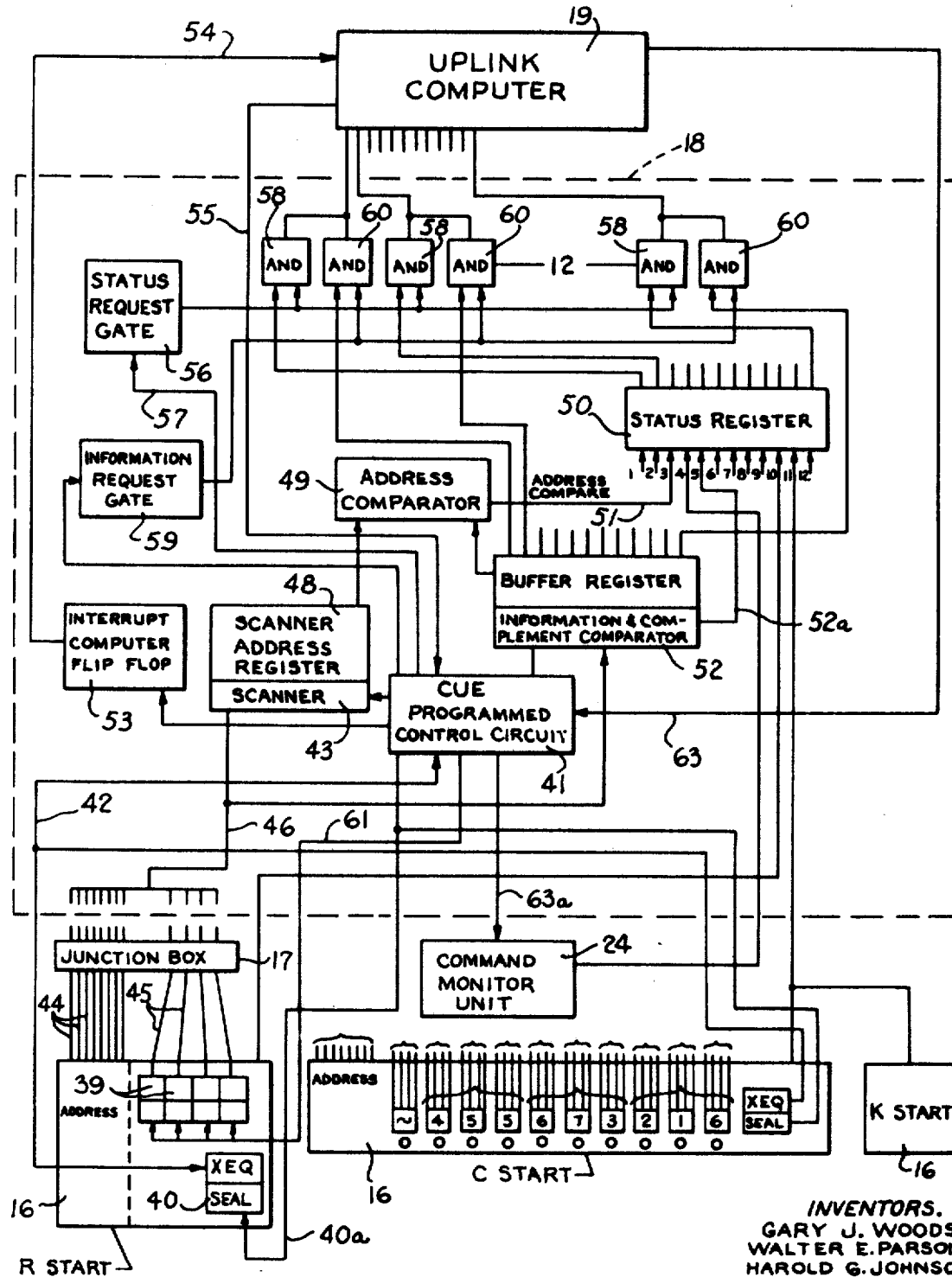
FIG. 2 is a block diagram illustrating a portion of the command system which forms a part of the acceptance checkout equipment system which includes start modules that are located in the control room, a communication unit executor system, and the up-link computer.

FIG. 2 illustrates in block form the communications unit executor circuit 18 and the start modules 16 which provide the interface between the test operator located in a control room and the up-link computer utilized within the acceptance checkout equipment system. Each communication unit executor circuit 18 is capable of monitoring two hundred and fifty-six start modules for providing a two-way communication path over which pass the operator's functional request and validity analysis check responses from the computer.

In the particular embodiment of the invention illustrated, three types of start modules are utilized: A relay selection start module identified as R-start module, computer communication start modules identified as C-start modules, and keyboard start modules identified as K-start modules.

The R-start module provides a means of manually initiating transmissions in the form of signal commands to a spacecraft and its associated ground support equipment, via the up-link portion of the acceptance checkout equipment system for commanding a function to be performed by the functional elements carried within the spacecraft and the ground support equipment. One example of a function which may be controlled by the R-start module is closing a relay, which upon closure will activate a functional component, such as a fuel cell circuit located within the spacecraft for testing the operability of the fuel cell. Such is discussed more fully below in connection with the receiver decoder.

In order to reduce power requirements in the communication unit executor, junction boxes 17 are connected between the communication unit executor and groups of start modules. Specifically, each junction box 17 supplies all the necessary logic and lamp power to sixteen start modules. The prime function of the junction boxes is to serve as a near proximity source of power to start modules which may be remote from the communication unit executor 18.

In the physical construction of the R-start modules there are four R-start modules carried by an enclosure (see FIG. 12), each of which are adapted to be readily inserted and removed from a console. A typical front panel for an R-start module is illustrated in FIG. 3. Each R-start module has four split legend functional switches 39 mounted thereon, an execute switch XEQ, and a seal switch 40. When an operator desires to send a command signal to a functional element located in the spacecraft or its associated ground supporting equipment he merely depresses one or more of the functional switches 39 of a particular R-start module causing the lower half 39a of the depressed functional switches to be illuminated, which indicates to the operator that the desired command signal is ready to be executed. Each of the functional switches is appropriately labeled for identifying the function which is to be performed when such is depressed.

After the operator has loaded the desired functional switches, he then presses the execute button XEQ which causes a signal to be initiated and transmitted to the program control circuit 41 located in the communication unit execute circuit via lead 42. The CUE program control circuit 41 sends a signal to a scanner 43 which is scanning the 256 start modules and causes the scanner to stop on the R-start module which has been activated by the depression of the execute switch. If the selected command is carried out, a signal is produced by the computer 19 causing the upper-half 39b of the previously depressed functional switches to be illuminated. Simultaneously, the upper-half of the XEQ switch is extinguished. Under normal conditions the data transfer will be so rapid that the XEQ switch will appear to remain extinguished. By means of the above sequence, the status of the relays under control of an operator will at all times be displayed on the upper-half 39b of the functional switches and the status to which the relays will be set by subsequent depression of the XEQ switch will be displayed on the lower-half 39a of the functional switches.

As previously mentioned, the start modules are adapted to be plugged in an enclosure which includes four of such modules, and in turn, four of such enclosures are electrically connected to a junction box. Each R-start module will have a unique eight bit address associated therewith, as well as a four bit functional code which is transmitted over leads 44 and 45, respectively. When the CUE scanner 43 stops at the activated R-start module the eight bit address signal, as well as the four bit functional code is transmitted over twelve lines 46 and stored in a buffer register 47 as a twelve bit word. The scanner 43 has an address register 48 associated therewith, which produces an address depending upon the location of the scanner 43 which should correspond with the address of the particular module being scanned. An address comparator 49 is provided for comparing the address of the scanner register 48 with the eight bit address transferred from the activated R-start module to the buffer register 47. If the scanner address and the activated module address which is stored in the buffer register 47 do not compare, then a signal is sent to a status register 50 by means of line 51 indicating such.

The CUE program control 41 then causes the R-start module to send a second word, which is the complement of the first word, over line 46 to an information complement comparator 52 located in the buffer register 47 so that the functional portion of the transmitter word can be compared with its complement in order to detect transmission errors. If the information stored in the buffer register 47 does not compare with is complement, a signal is produced by the information complement comparator 52 and is sent to the status register 50 indicating such via lead 52a.

After the comparisons are made the CUE program control circuit 41 then sends an interrupt signal by means of an interrupt computer flip-flop 53 and lead 54 to the up-link computer 19 indicating that the CUE circuit is ready to transmit a command thereto. Responsive to the interrupt signal from the CUE program control circuit 41 the computer then sends a coded signal by means of lead line 55 to the CUE program control circuit 41, which in turn, sends a signal to a status request gate 56 by means of lead 57.

The status request gate 56 causes information stored within the status register 50 to be transferred to the computer 19. If the address produced by the R-start module and the scanner address 48 do not compare, the computer 19 sends a signal to the command monitor unit 24 indicating such. The same is true if the function code does not compare with its complement.

It is noted that the status register 50 in the embodiment of the invention illustrated has twelve input terminals 1 through 12, respectively, each of which indicates that a specific condition exists. For example, if input terminal 1 has been activated by a signal, such indicates that there has been a terminal fault, a signal on terminal 2 indicates manual mode select, a signal on terminal 3 indicates address does not compare, a signal on terminal 4 indicates that the command monitor unit is filled, a signal on terminal 5 indicates that the information does not compare, a signal on terminal 6 indicates interrupt inhibited, terminals 7, 8, and 9 are spare terminals, a signal on terminal 10 indicates that an R-start module is requesting service, a signal on terminal 11 indicates a C-start or K-start module is requesting service, and a signal on terminal 12 indicates CUE has an interrupt line up. The input leads 1 through 12 are suitably wired into the circuitry for indicating when a particular condition exists.

Each of output leads of the status register 50 is connected to a respective "and" gate 58. An output signal from the status request gate 56 is also fed to each of the "and" gates 58 associated with the status register 50 when activated. Thus, when the status request gate 56 is activated, signals from the status register 50 are transferred therefrom to the up-link computer 19. If the information being transferred to the up-link computer 19 indicates that the system is operating properly, the computer 19 then sends a signal by means of lead 55 to the CUE program control circuit 41 requesting that the information stored in the buffer register 47 be transferred thereto. The CUE program control circuit 41 in turn sends a signal to an information request gate 59 which activates all of the "and" gates 60 connected to the output lines of the buffer register 47 enabling the information from the buffer register 47 to be transferred to the up-link computer 19. The computer then sends the binary word transferred from the buffer register 47 back to the buffer register 47 by means of the same leads so that such can be compared for transmission errors. If the signal sent back from the up-link computer 19 to the buffer register 47 compares with the information that was stored within the buffer register 47, the buffer register in turn sends a check signal back to the computer 19 indicating that there was no transmission error. If the signal transferred back from the computer 19 does not compare with the information in the buffer register 47, the buffer register will send back a twelve bit word to the computer, and where the bits of the two words compare a "1" will be sent, and where the bits do not compare a "0" signal will be sent. The computer in turn sends a signal by leads 63 and 63a to the command monitor unit 24 via CUE indicating that there is a transmission error.

The portion of the circuit enclosed within the broken line 18 of FIG. 2 is all part of the communication unit executor illustrated in block 18 of FIG. 1.

The start modules 16 are provided with sealed circuits which inhibits the function of the execute button. The sealed circuits can be automatically activated by the computer 19 which sends a signal via the communication unit executor and cables 40a and 63 thereto. The communication unit executor 18 may be placed in an automatic mode for interrogating the start modules for information contained therein without the test engineer depressing an execute button XEQ. The automatic mode enables the test engineer to place information in the up-link computer 19, which in turn, up-dates the information without having to press the execute button and interrupt the scanning operation of the computer 19. The computer in its normal scanning operation will pick up the change automatically and take the appropriate action for such.

An example of a C-start module, which may be utilized in the acceptance checkout equipment, is illustrated in FIG. 4.

The C-start modules shall provide to the computer by means of the communication unit executor 19 digital information for selecting computer sub-routines, which in turn, cause coded digital words to be transmitted through the command system to a digital to analogue converter module DAC (see FIG. 6) located within a system of the space vehicle. The digital to analogue converter module DAC in turn generates an analogue signal responsive to the coded words and supplies such to a functional element causing the desired function to be performed thereon. The C-start module has ten selectors 64 through 73 thereon. Each selector has a dial 64a through 73a, respectively, associated therewith, so that the setting on the selector switches may be changed by rotating the dials.

If, for example, the test engineer desires to send a coded signal to a particular digital to analogue converter module DAC located within the spacecraft for causing the DAC module to produce a sinusoidal wave for precessing a gyroscope used within the space vehicle, he would dial the code on the selector switches in the appropriate C-start module. The leftmost selector switch 64 would denote the desired function which in this particular example is a sinusoidal wave. The next three selector switches 65 through 67 would denote the amplitude of the sine wave. The next three selector switches 68 through 70 would denote the frequency of the sine wave, and the last three selector switches 71 through 73 would denote the duration of application of the sine wave. The C-start module automatically converts the information which was dialed therein, into four digital words, and when the execute button XEQ is depressed such information is conveyed to the up-link computer 19 through the communication unit executor 18. Each of the C-start modules has an eight bit address similar to that of the R-start modules which identifies the modules. Each of the selector switches 64 through 73 have four output leads connected thereto for generating a four bit functional code similar to that produced by an R-start module (see FIG. 2).

After the operator has loaded the desired functional switches, then he presses the execute button XEQ which causes a signal to be initiated and transmitted to the program control circuit 41 located in the communication unit execute circuit via lead 4. The CUE program control circuit 41 sends a signal to the scanner 43 which is scanning the start modules and causes the scanner to stop on the activated C-start module. The scanner scans the information from the C-start module in the form of four twelve bit computer words. The first word contains eight bits of information identifying the address for the C-start module and four functional bits which are produced by the selector switch 65. The first word is sent to the CUE and the eight bit address and four bit function which constitutes the word are compared for transmission errors in the same manner as were the signals from the previously described R-start modules. The scanner then moves on to the next word which consist of twelve binary bits of information produced by the selector switches 65, 66 and 67. After a comparison has been made for transmission errors within the communication unit executor 18 the third and fourth words are transmitted from the C-start register in a like manner. Other type start modules may be utilized for controlling functional systems within the space vehicle, such as a K-shart module, which is adapted to send digital words through the computer to the guidance and navigational control system for the space vehicle in order to check out such. The junction box 17, communication unit executor 18 and C-start, K-start, and R-start modules may consist of any conventional, well-known designs. Suitable designs for these elements are disclosed in a publication entitled "ACE–S/C Data Entry Equipment," Accession No. N69–75691, NASA–CR–104083.

After the computer 19 receives the command signals from the communication unit executor 18, it transmits two binary coded words consisting of twelve bits each to a selected data transmission and verification converter 20 associated with a particular digital test command system 22 located within the spacecraft or its associated ground support equipment. The information coming into the computer 19 from the CUE 18 determines which digital test command system 22 will be selected.

As previously mentioned, the data transmission and verification converter 20 receives the two twelve bit parallel words from the computer and transmits a message of forty-eight bits of information in serial form to the receiver decoder 23 located in the digital test command system associated with the spacecraft or the ground support equipment. The data transmission and verification converter may consist of any conventional, well-known circuits. Suitable circuits are disclosed in a publication entitled "ACE–S/C Computer Peripheral Equipment," Accession No. N69–75690, NASA–CR–104076.

The data transmission and verification converters 20 also receive coded messages from the receiver decoders 23 which indicates whether a transmission error has taken place between the data transmission and verification converters and the modules under control of the computer located within the spacecraft or ground support equipment. Such information is transmitted over a coaxial cable as illustrated by lead line 75 in FIG. 1.

Figure 6:
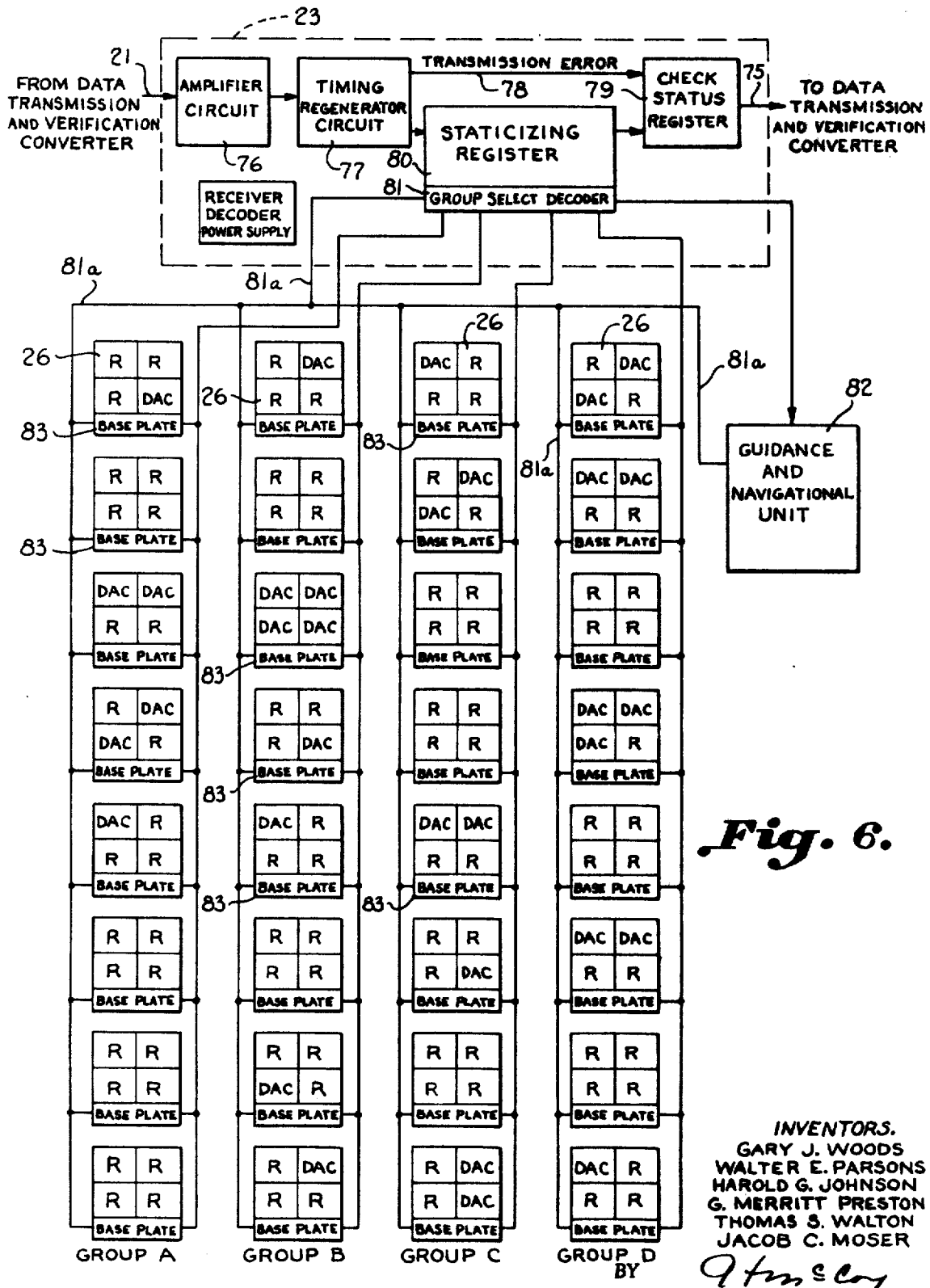
FIG. 6 is a block diagram illustrating a digital test command system which may be carried in the spacecraft and includes a receiver decoder and translating circuitry for selecting a particular functional element within the spacecraft or space vehicle.

Information from the computer by way of the data transmission and verification converter 20 is accepted by a receiver decoder 23 of a particular digital test command system 22. The components of the receiver decoder are illustrated in FIG. 6, and are enclosed within the broken line 23. The forty-eight bit bi-polar message being transmitted by a data transmission and verification converter 20 is first fed to an amplifier circuit 73 which matches and equalizes the coaxial cable 21 so as to avoid signal degradation. The signals coming from the data transmission and verification converter 20 are supplied via an amplifier circuit 76 to a timing regenerator circuit 77. Each time the bi-polar signal crosses a zero reference line a clock pulse is generated within the timing generator for controlling a strobing signal for determining by sampling the second half of the bi-polar bit if such is a binary "1" or a binary "0." If the strobe signal is negative, such will indicate that the signal is a binary "0," whereas, if the strobe signal is positive, such indicates that the binary signal is a "1." The timing generator 77 transmits the results of a forty-eight bit count via lead 78 to a check status register 79. If the count is other than forty-eight bits there is a transmission error, and the check status register 79 sends a message back by means of cable 75 to the data transmission and verification converter 20 and the computer 19 indicating such.

The timing regeneration circuits also counts the bits of information coming therein and decodes the message into four groups of twelve bit words, the first and third twelve bit word being a data word, and the second and third twelve bit word being a redundant word of a respective data word. These four twelve bit words are then routed to a staticizing register 80. The staticizing register consists of two twelve bit shift registers which are used to store the actual message content of the forty-eight bit message. The redundant bits are not stored. The first twelve bits are stored in one twelve bit section and the next twelve bit word of redundant data is compared bit by bit with the contents of the shift register. If the redundancy check fails, a transmission error is generated which is fed to the check status register 79 and simultaneously inhibits further processing of the message. If there is no error, the next twelve bits are stored in the second twelve bit section of the staticizing register and compared with the next group of redundant bits in the same manner. Following the acceptance of the message, the shift register contents are fed into a group select decoder 81 in the form of a twenty-four bit word. One example of a twenty-four bit word, which is utilized to transmit information to a relay buffer memory subgroup located within a module in the digital test command system 22 of the spacecraft or its ground support equipment is illustrated in FIG. 7.

Figure 7:
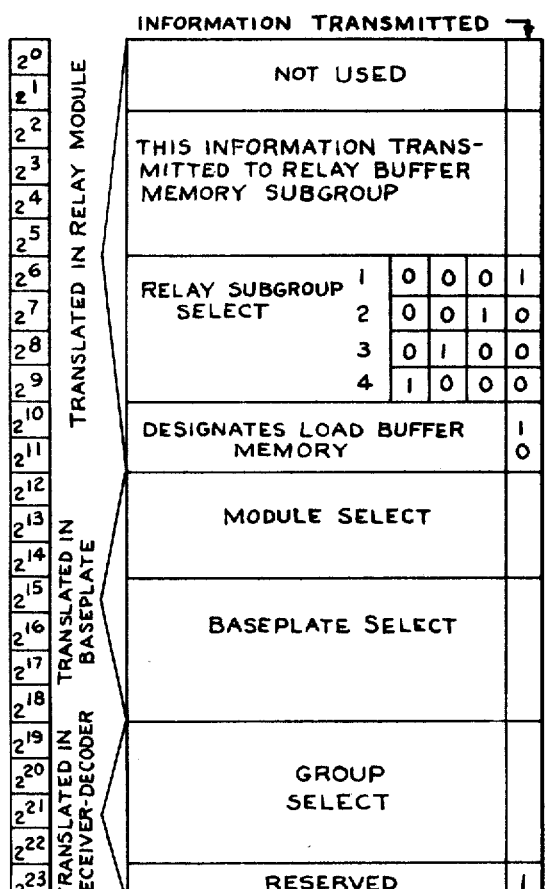
FIG. 7 illustrates a message which includes twenty-four binary bits of information which are utilized for selecting a particular functional element carried within the space vehicle or its associated ground support equipment and designates the function to be performed thereon.

Referring briefly to the message illustrated in FIG. 7, it can be seen that the bit $2^{23}$ is a spare bit of information and is not being used in selecting the desired relay buffer memory subgroup. The next four bits $2^{19}$ through $2^{22}$ are used to select a base plate group. The following four bits $2^{15}$ through $2^{18}$ are utilized to select one of eight base plates located within the previously selected group. The next three bits $2^{12}$ to $2^{14}$ are utilized to select a module which may be an R module which consists of sixteen relays or a digital to analogue converter module. The next two bits $2^{10}$ or $2^{11}$ designate whether the information should be stored in a buffer memory or whether the information should be first compared with the information sent from the staticizing register before being transferred to the relays. The next four bits of information $2^6$ through $2^9$ are provided for selecting one of the relay subgroups, each of which include four relays. The next four bits of information $2^2$ through $2^5$ are utilized to activate one or more of the four relays within a particular subgroup. In the particular message illustrated in FIG. 7 the bits $2^0$ and $2^1$ are not being utilized.

Referring back to FIG. 6, the group select decoder checks the four address bits $2^{19}$ through $2^{22}$ for legality and provides the proper gating if the address is correct. If the address indicates no error, an enabling signal is sent by lead 81a to all of the base plates located in each group and the bits $2^2$ through $2^{18}$ are transmitted to one of the four groups A through D depending on the code being sent or to a guidance and navigational unit 82. If the four bits of information $2^{19}$ through $2^{22}$ contained information which was not proper for selecting one of the groups A through D, or the guidance and navigational unit 82 an error signal would be sent from the staticizing register 80 to the check status register 79, which in turn, conveys the information back to the computer 19 and the message is inhibited from being transmitted further into the circuitry. For the purpose of illustration, the information illustrated in FIG. 7 will be traced throughout the entire circuit in order to illustrate the components being activated by such.

Each of the groups of base plates A through D include eight base plates 83, each of which has a group of four modules plugged therein. The modules may be R modules, each of which includes sixteen relays, or may be digital to analogue converter modules referred to as DAC. Referring to FIGS. 6, 9 and 9A, it can be seen that the bits of information labeled $2^{15}$ to $2^{18}$ are fed to all of the base plates within the group and depending upon the code set up by the bits of information such selects one of eight of the base plates 83. The bits of information $2^{15}$ to $2^{18}$ are also fed to an error detection logic circuit 84 which determines if the bits of information are a legal address for selecting one of the eight base plates.

If an illegal address exists, the word shall not be gated to the remaining translating circuitry and an error signal is sent by the error detection logic circuit 84 to the check status register 79 which in turn sends a coded signal by means of cable 75 through a data transmission and vertification converter 20 to the computer 19. False or error detection logic circuits, such as illustrated at 84, are associated with each base plate 83 throughout the entire circuitry.

After one of eight of the base plates of any group has been selected the bits $2^{12}$ to $2^{14}$ are fed into a module select 85 which selects one of the four modules labeled R or DAC in FIG. 6, as well as in FIGS. 9 and 9A. The module select circuit 85 also has an error detection logic circuit 86 associated therewith, for recognizing legal addresses for selecting one of four of the modules. If an illegal address exists in the coded bits $2^{12}$ through $2^{14}$ then the error detection logic circuit 86 sends a signal to the check status register 79 indicating such. The check status register in turn conveys such information by means of cable 75 to the up-link computer 19.

Each of the R or DAC modules incorporate a logic circuit therein for responding to a command received by the bits $2^{10}$ and $2^{11}$. Assuming that the R module was selected by the module select 86, if the bit $2^{11}$ is a "1" and the bit $2^{10}$ is a "0," such would be an execute command for a relay module. If the bit $2^{11}$ were a "0" and the bit $2^{10}$ were a "1," such would command the relay module to load a buffer memory. If the bit $2^{11}$ were a "1" and the bit $2^{10}$ were a "0" and the module selected were a DAC module, such would indicate that the analogus signal should produce a negative potential output. If the relay module were a DAC module, and the bit $2^{11}$ were a "0," the bit $2^{10}$ were a "1," such would command the DAC module to produce an output signal having a positive potential. All other combinations which are possible to be produced by the $2^{11}$ and $2^{10}$ bits are recognized as being illegal. If an illegal combination exists, the remaining information (bits $2^9$ through $2^0$) shall receive no further translation, and a signal is sent to the check status register 79 indicating such.

Assuming that the bit $2^{10}$ is a "1" and the bit $2^{11}$ is a "0," as is the case of the message illustrated in FIG. 7, and the module selected is a relay module, a signal is sent to a buffer memory 88 which is associated with the relay module via lead 91 (see FIG. 9A).

The buffer memory 88 includes four subgroups corresponding to the subgroups 1, 2, 3, and 4, respectively, in a particular module. Each of the subgroups of the relay module contains four relays thus, the entire relay module, such as illustrated at R, contains sixteen relays.

The buffer memory 88 is capable of storing sixteen bits of information. The bits of information $2^6$ through $2^9$ are fed through an error detetion circuit 89 which determines if such is illegal or legal address. If they contain an illegal address, a signal will be sent to the check status register 79 indicating such, which will in turn send a signal by the coaxial cable 75 to the up-link computer 19. If the address is a legal address, an enable signal is sent by the error detection circuit 89 to its associated subgroup decoder 90 via lead 90a and the signals $2^6$ through $2^9$ are sent to the subgroup decoder 90 which selects one of the subgroups, generally designated as 1, 2, 3 and 4, respectievly. If the mode code ($2^{10}$ and $2^{11}$) coming in one line 91 is a load buffer memory signal as in indicated in FIG. 7, the information contained in the bits $2^2$ through $2^5$ is fed into the load buffer memory and temporarily stored there. However, if bit $2^{11}$ is a "1" and bit $2^{10}$ is a "0," which is an execute comand, the four bits (bits $2^5$ to $2^2$) of information coming from the staticizing register 80 via leads 88e shall be compared with the information stored in the buffer memory of the subgroup specified by the bits $2^9$ through $2^6$. If the contents of the information in the buffer memory 88 compares with the contents of the information coming from the staticizing register 80, an execution memory 92 shall be loaded from one of the buffer memory subgroups 88a through 88d. The signal for activating the execution memory 92 is received from mode decode via lead 91. The execution memory subgroup shall immediately actuate the relays in one of the subgroups 1, 2, 3 or 4 with the information contained in the bits $2^2$ through $2^5$. For example, if bit $2^2$ were "1" and bits $2^3$, $2^4$, and $2^5$ were "0" and subgroup "1" were selected then relay 1–1 of subgroup "1" would be energized, while relays 1–2, 1–3 and 1–4 would remain de-energized. The relays are connected in a suitable circuit, containing a power supply, which is activated by the bits $2^2$ to $2^5$.

Each of the relays located within the relay module has a contact connected in a circuit which includes a functional element located within the spacecraft. Only the relays 1–1, 1–2 and 4–3 are illustrated in FIG. 9 as being connected in a circuit associated with the functional element. In operation, if the relay 1–1 were selected to be closed by the binary coded information contained in the bits $2^2$ through $2^5$, such would close its contact 93. It is noted that the contact 93 is connected in shunt with a control switch 94 carried within a spacecraft. The control switch 94 is in turn connected in a fuel cell circuit which includes a fuel cell 95, and a relay 96, which upon energization closes the fuel cell circuit. The fuel cell 95 supplies power to the instrument panel lights 97, as well as to telemetry transmitter 98. Normally, the control switch 94 is closed by an astronaut. However, during the checkout operation when the relay 1–1 is energized closing contact 93 such completes the circuit to the relay 96 located in the fuel cell circuit energizing such which in turn closes contact 96a. A transducer 99, connected in the fuel cell circuit, will sense energization of the fuel cell circuit and during the monitoring operation will transmit a signal to the control room through the down-link portion of the system for indicating to the test engineer whether the fuel cell is operating properly. The instrument panel lights may be checked out in a similar manner by energization of the relay 1–2 and shunting the control switch 100. The telementry transmitter 98 is checked out by closing or energizing relay 4–3. Relay contact 101 is connected in shunt with the telemetry transmitter control switch 102 so that when the relay 4–3 is energized the contact 101 will shunt the control switch permitting the telemetry transmitter to be energized. The relays carried within the relay module may be of the latching type or the non-latching type. One advantage in using latching type relays is that if there is a power failure after a coded signal has been routed to a particular relay, the relay will not disengage thereupon.

The digital test command system portion of the acceptance checkout equipment is program passive. For example, if such is commanded to a state, it remains in that state until commanded to change. This concept permits absolute step control over the digital test command system output to the system under test. Every time a step is transmitted in the digital test command system, a check status reply is received back at the computer complex indicating the disposition of the command and what, if any, failure occurred.

Figure 8:
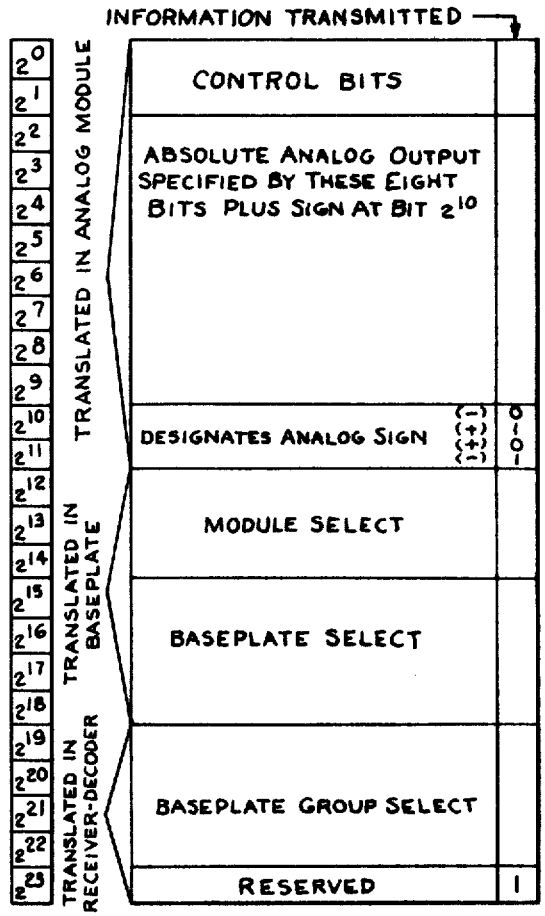
FIG. 8 illustrates another example of a message that may be utilized for selecting a particular functional component located within the space vehicle or in its ground support equipment and the function to be performed thereon.
Figure 10:
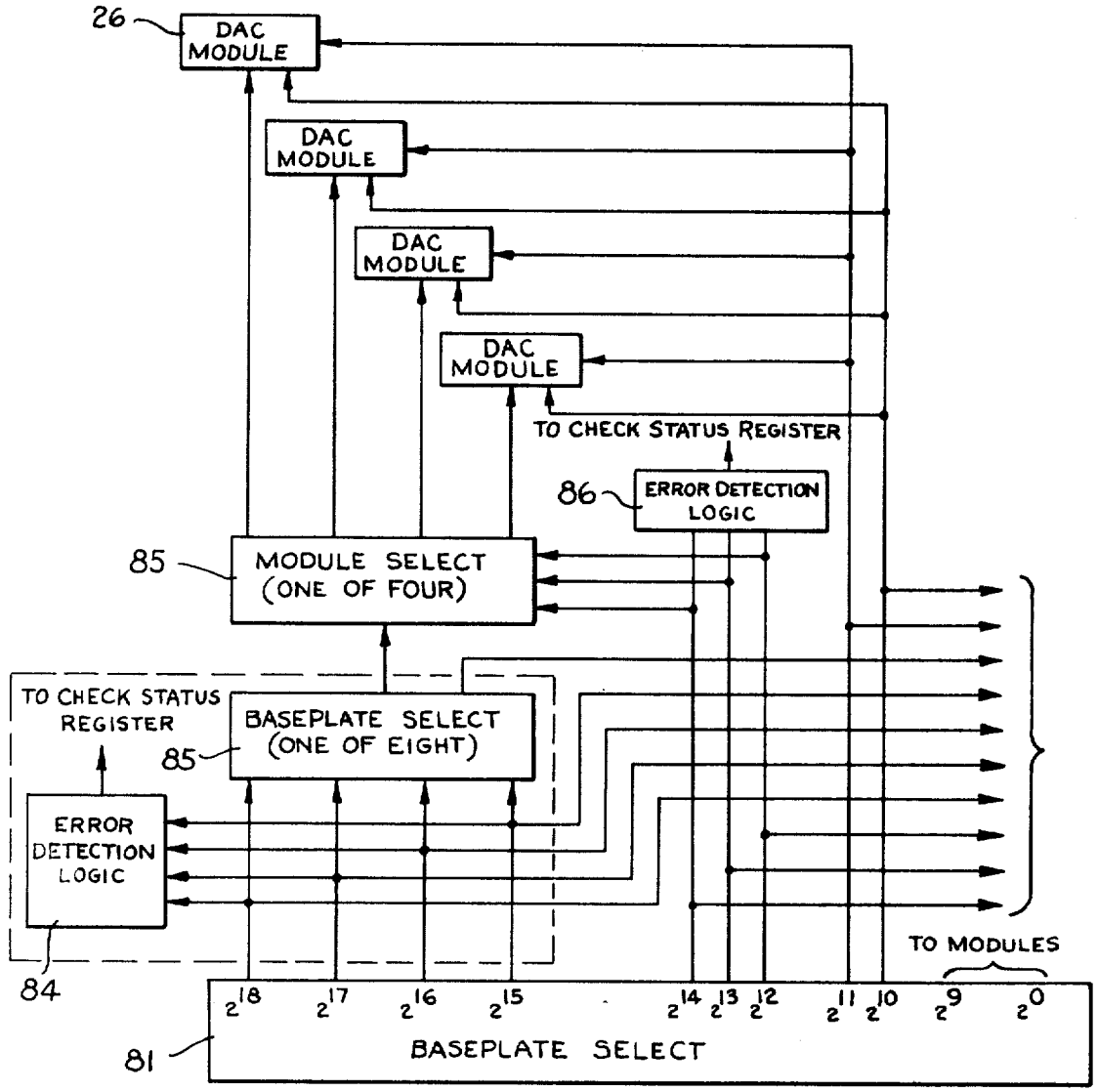
FIG. 10 illustrates the circuitry in block form and the flow of information therethrough for selecting an analogue module.

The manner in which the digital to analogue converter module referred to as a DAC module is selected in similar to that as previously described in selecting a relay module. An example of a message used to select the DAC module is illustrated in FIG. 8. A block diagram of the circuitry used for selecting the DAC module is illustrated in FIG. 10. The bits $2^{12}$ through $2^{23}$ as shown in FIG. 8 are utilized to select the proper DAC module and such is accomplished in the same manner as the previously described R module was selected. The bits of information $2^{10}$ and $2^{11}$ designate the polarity for the analogue function which is to be produced by the DAC module. The bits $2^2$ through $2^9$ represent the output voltage that is to be produced by the analogue module DAC. The bits $2^1$ and $2^0$ act as control bits of information transferred within the analogue module DAC.

Figure 11:
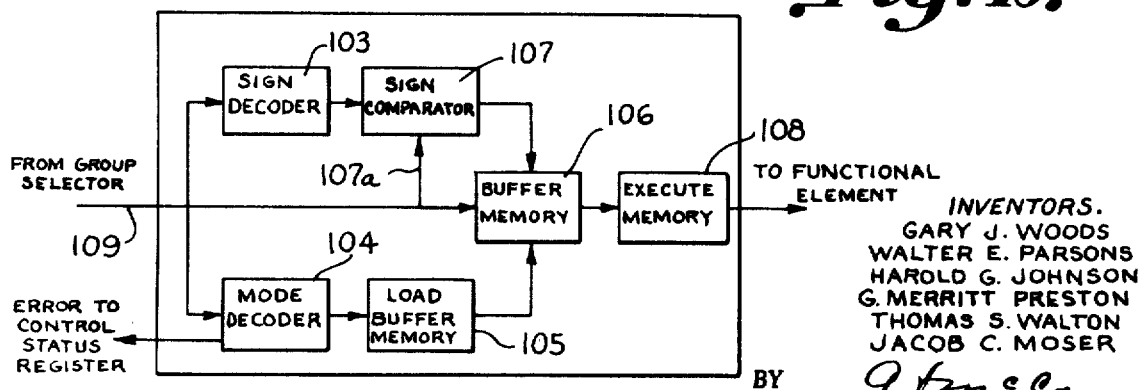
FIG. 11 illustrates in block form components of the digital to analogue converting module.

Referring to FIG. 11, which illustrates in block form, a DAC module, the module includes a sign decoder 103, a mode decoder 104, a load buffer memory circuit 105, a buffer memory circuit 106, a data comparator circuit 107, and an execute memory circuit 108. Signals coming from the group selector associated with the staticizing register are fed in over a plurality of lines indicated as a single line 109 in FIG. 11. As previously mentioned, the two bits $2^{10}$ and $2^{11}$ are fed into the sign decoder 103 and designates the polarity of the output analogue signal which is to be produced. The information contained in the bits $2^2$ through $2^9$ coming from the staticizing register is fed directly into the buffer memory 106 to load such. It is also available at the data comparator input 107a. The bits $2^1$ and $2^0$ act as control bits of information for transferring the information contained in the bits $2^2$ through $2^9$ within the DAC module. Control of information within the module shall be as follows: When $2^0$ is a "0" and $2^1$ is a "1" the information from the staticizing register is fed directly into the buffer memory 106. When $2^0$ is a "1" and $2^1$ is a "0" the contents of the buffer memory 108 are checked against the contents supplied by the staticizing register in the data comparator 107, and if the check is good the buffer memory contents are shifted to the execute memory 108, which generates an output voltage as directed by the information. If the signals $2^0$ is a "1" and the signal $2^1$ is a "1" the contents of the staticizing register is shifted directly to the execute memory 108, and the digital to analogue conversion is effected immediately without a buffer memory check. If the control mode of information contained in the bits $2^0$ and $2^1$ are both "0" when such is fed to the mode decoder 104, an error signal is sent to the control status register 79. Thus, it can be seen that the mode decoder determines whether the load buffer memory shall send an enable signal to the buffer memory 106 to load the incoming information therein, or feed the information directly to the execute memory 108. The mode decoder 104 can also send a signal to the buffer memory 106 which causes the information stored in the buffer memory to be compared with the information coming from the staticizing register. Normally, it takes several word messages transmitted in succession to construct an analogue signal.

Only the operation of an R or relay type module and a DAC or analogue module have been described in detail. However, it is to be pointed out that it is within the scope of the invention to utilize other types of modules, such as a conventional guidance and navigation module which generates signals into an onboard guidance computer located within the spacecraft. The guidance and navigation module is generally controlled by the K-start module located within the control room. The guidance and navigational module may consist of any conventional, well known design. One suitable design is disclosed in a publication entitled "ACE–S/C Equipment System Description," Accession No. N69–75685, NASA–CR–104078.

FIG. 12 illustrates a console which is utilized for housing the start modules which are associated with the command system and the data display media forming a part of the monitoring system. The test engineer sits in front of the console and by depressing buttons or selector switches on the modules sends his command signals to the spacecraft and its associated ground support equipment. The signals coming back through the monitoring system or down-link system are displayed on the cathode ray tube 37 in alphanumerical characters, or may be displayed by the analogue meters 110. The information being received through the monitoring system may also be displayed by discrete "on-off" lights located in the meters, generally designated at 111 and 112. Thus, it can be seen that the information under control of the test engineer sitting at the console is co-ordinated, since the display media and the control start modules are located directly in front of him for visual observation.

It is to be understood that the above described spacecraft checkout system may be used to check out any aerospace or industrial related equipment or system. The checkout system may also be connected to another similar checkout system or a plurality of checkout systems for the purpose of providing appropriate communications therebetween. For example, additional data transmission and verification converters 20 may be connected to the up-link computer 19 to provide communications between the data transmission and verification converters of other similar checkout systems, such as, the checkout systems for the various booster stages of a space vehicle. A remote display capability for the checkout system may be further provided by including an additional data transmission and verification converter 20 connected between the down-link computer 32 and a remotely located display unit consisting of an additional data transmission and verification converter 20, signal generator and storage unit 36, cathode ray tubes 37, and any necessary interfacing components.

Obviously, numerous modifications and variations of the present invention are possible in light of the above teachings. It is, therefore, to be understood that within the scope of the appended claims the invention may be practiced otherwise than as specifically described.

What is claimed and desired to be secured by the United States Letters Patent is:

1. A command system for functional components of a space vehicle and its associated supporting equipment for conveying command signals from a remote command center to the functional components comprising:
   (A) a plurality of start modules located in a remote command center;
   (B) means for selectively activating a start module for generating a command signal in digital form identifying a particular functional component and the function to be performed thereon;
   (C) a communication means for scanning said start modules and temporarily storing the command signal from an activated module;
   (D) a transmission validity checking circuit forming a part of said communication means for comparing the transmitted command signal with a redundant command signal for determining transmission errors;
   (E) a computer coupled to the output of said communication means for receiving the command signal from said communication means and generating a functional code responsive thereto;

(F) data transmission and verification converting means coupled to the output of said computer for transforming said functional code into a set of sequential digital words comprising a frame of bits and its complement for transmission over long distances with a minimum of degradation; and (G) a receiver decoder coupled to the output of said data transmission and verification converting means for comparing each frame of sequential bits with its complement and for transmitting a signal indicative of the desired function to be performed to the selected functional component when said frame of bits compares with its complement.

2. The command system as set forth in claim 1, wherein said start modules generate a plurality of identifying parallel bits of information when activated and wherein a portion of said parallel bits represent an address and the remainder of the parallel bits represent a particular function to be performed.

3. The command system as set forth in claim 1, wherein said receiver decoder converts the sequential bits of information coming therein into words of parallel bits.

4. The command system as set forth in claim 1, wherein said computer transmits a signal to said activated start module responsive to activating a functional component for indicating that such function has been carried out.

5. The command system as set forth in claim 1 further comprising:
(A) a coaxial cable;
(B) one end of said coaxial cable being connected to the output of said data transmission and verification converting means; and
(C) the other end of said coaxial cable being connected to the input of said receiver decoder;
(D) whereby said frame of bits and its complement are transmitted in serial form from said data transmission and verification converter over said cable to said receiver decoder.

6. A monitoring device for functional components located in systems such as incorporated in a space vehicle and its associated supporting equipment comprising:
(A) a plurality of sensing transducers carried in each system for sensing the operability of said components;
(B) a pulse code modulator for receiving the signals from the sensing transducers of a system and converting said signals into words of sequential bits of digital information;
(C) means for interleaving the words of sequential bits of digital information from the pulse code modulator of said system for producing a sequential chain of binary bits of information;
(D) a remotely located decommutator provided for receiving said chain of binary words from said interleaving means;
(E) said decommutator reconstructing the sequential chain of binary bits of information into binary words and feeding said reconstructed words out;
(F) a computer provided for receiving the binary words from said decommutator and checking selected words against preprogrammed tolerances;
(G) said computer converting said binary words into signals capable of activating display media; and
(H) display media located in a control room connected to the output of said computer for receiving said signals from said computer and producing information in the form adapted to be recognized by the human eye and comprehended by test engineers.

7. The monitoring device as set forth in claim 6, wherein said display media includes cathode ray tubes producing information in engineering units utilizing alphanumeric characters; which information is capable of being readily understood and used by test engineers.

8. A system for receiving a message including a plurality of serial binary words and their redundants for selecting a particular functional component and commanding a particular function to be performed thereon comprising:
(A) means for comparing said binary words against their redundants and generating error signals when said binary words fail to compare with their redundants;
(B) said functional components being electrically connected in groups and units;
(C) means for utilizing a first portion of said message for selecting a particular group in which a desired functional component is connected;
(D) means for checking said first portion of said message for determining if said first portion contains a legal address;
(E) means for utilizing a second portion of said message for selecting a particular unit in which a desired functional component is connected;
(F) means for checking said second portion of said message for determining if said second portion contains a legal address;
(G) means for utilizing a third portion of said message for selecting a particular functional component of a unit;
(H) means for checking said third portion of said message for determining if said third portion contains a legal address; and
(I) a fourth portion of said message being transmitted to a functional component for directing a particular function to be performed thereon;
(J) whereby said message is transmitted through a plurality of selecting and checking means in a step by step manner so that any malfunction in said circuitry and message is isolated and appropriate action can be taken for remedying the malfunction.

9. The system as set forth in claim 8 wherein:
(A) said selected functional component is a digital to analogue converting module; and
(B) said digital to analogue converting module converts said fourth portion of said message into an analogue signal.

10. The system as set forth in claim 9, wherein said digital to analogue converting module utilizes a plurality of binary messages in constructing an analogue output signal.

11. The system as set forth in claim 8 further comprising:
(A) means for converting said message which includes a plurality of serial binary words and their redundants into a single binary word of parallel form prior to such being transmitted to said selecting and checking means.

12. The system as set forth in claim 8 wherein:
(A) said selected functional component is a relay module;
(B) a plurality of relays included in said relay module; and
(C) means for energizing selected relays within said module according to information contained in said fourth portion of said message.

13. A command and checkout system for functional components of a space vehicle and the like comprising:
(A) a plurality of start modules located in a remote command center;
(B) means for selectively activating a start module for generating a command signal in digital form identifying a particular functional component and the function to be performed thereon;
(C) a communication means for scanning said start modules and for receiving command signals therefrom;
(D) a command computer coupled to the output of said communication means for receiving the command signal from said communication means and generating a functional code responsive thereto;
(E) said computer being programmed for producing predetermined command signals;

(F) a digital test command system for receiving said command signals from said command computer;

(G) said digital test command system transmitting a signal indicative of the desired function to be performed to a desired functional component;

(H) a pulse code modulation monitoring system for monitoring said functional components and generating a signal indicative of the operability of said functional components;

(I) a monitoring computer for receiving signals from said pulse code modulation system;

(J) said monitoring computer being programmed for checking said signals against predetermined tolerances;

(K) a shared memory connected between said command computer and said monitoring computer for providing two-way communication therebetween; and (L) display media means connected to the output of said monitoring computer for displaying said signals from said monitoring computer in engineering units.

14. A command and checkout system as defined in claim 13 wherein said command computer and said monitoring computer operate at independent and different speeds.

No references cited.

PAUL J. HENON, Primary Examiner

P. R. WOODS, Assistant Examiner

U.S. Cl. X.R.

340—146.1